(12) United States Patent  
Nørgaard et al.

(10) Patent No.: US 8,290,474 B2  
(45) Date of Patent: Oct. 16, 2012

(54) METHOD, APPARATUS AND COMPUTER PROGRAM PRODUCT FOR PROVIDING SMART CARD SECURITY

(75) Inventors: Bjarne Nørgaard, Copenhagen (DK); Pætur Petersen, Copenhagen SV (DK); Nikolaj Hesselholt Skov, Køge (DK); Marc Richarme, Slagelse (DK)

(73) Assignee: Nokia Corporation, Espoo (FI)

( * ) Notice: Subject to any disclaimer, the term of this patent is extended or adjusted under 35 U.S.C. 154(b) by 1042 days.

(21) Appl. No.: 12/248,497

(22) Filed: Oct. 9, 2008

(65) Prior Publication Data

US 2010/0095364 A1  Apr. 15, 2010

(51) Int. Cl.
H04B 1/04 (2006.01)
H04M 1/00 (2006.01)
G06F 7/04 (2006.01)

(52) U.S. Cl. ........ 455/410; 455/558; 455/411; 455/418; 726/9

(58) Field of Classification Search .................. 455/558, 455/410, 411, 418; 726/9
See application file for complete search history.

(56) References Cited

U.S. PATENT DOCUMENTS

| 2008/0244148 A1* | 10/2008 | Nix et al. ................ 710/313 |
| 2008/0268842 A1* | 10/2008 | Herrero-Veron ......... 455/435.1 |
| 2009/0305668 A1* | 12/2009 | Ahn et al. ................ 455/410 |
| 2009/0325641 A1* | 12/2009 | Lee et al. ................ 455/558 |

FOREIGN PATENT DOCUMENTS

| EP | 1 549 090 A2 | 6/2005 |
| EP | 1 675 029 A2 | 6/2006 |
| EP | 1 937 015 A1 | 6/2008 |
| EP | 2 134 061 A2 | 12/2009 |
| KR | 2006-809234 | * 3/2006 |

OTHER PUBLICATIONS

International Search Report and Written Opinion for International PCT Application No. PCT/IB2009/007086 mailed Feb. 4, 2010.

* cited by examiner

Primary Examiner — Ariel Balaoing
(74) Attorney, Agent, or Firm — Alston & Bird LLP (57) ABSTRACT

An apparatus for providing smart card security may include a processor. The processor may be configured to determine, for a mobile terminal locked to a smart card, whether a temporary subscriber identifier is being read from the smart card or whether the mobile terminal is receiving a new temporary subscriber identifier from a network in communication with the mobile terminal, compare a network identifier associated with the temporary subscriber identifier to a network identifier included in a permanent subscriber identifier associated with the smart card in response to a determination that the temporary subscriber identifier is being read from the smart card, compare a network identifier associated with the new temporary subscriber identifier to a network identifier associated with a previous temporary subscriber identifier in response to a determination that the new temporary subscriber identifier is received from the network, and determine whether to invalidate the temporary subscriber identifier or the new temporary subscriber identifier based on a result of a respective one of the comparing operations.

20 Claims, 3 Drawing Sheets

METHOD, APPARATUS AND COMPUTER PROGRAM PRODUCT FOR PROVIDING SMART CARD SECURITY

TECHNOLOGICAL FIELD

Embodiments of the present invention relate generally to network communication technology and, more particularly, relate to a method, apparatus and computer program product for providing security for smart cards against "man-in-the-middle" attacks.

BACKGROUND

Mobile terminals are becoming increasingly ubiquitous in the modern world with ever larger numbers of users of all ages and all levels of sophistication owning or having access to mobile communication and/or processing devices. In an effort to market products to such users in a very competitive marketplace, service providers or network operators have adopted a strategy of offering low cost or even free phones to users. In an effort to ensure that such users engage the network operator thereafter for the provision of services for the low cost or free phones, the phones have typically been locked to the corresponding network operator. These phones are sometimes referred to as "subsidized" handsets.

Historically, one mechanism for conducting such "locking" between a phone and a network operator has related to the provision of a subscriber identity module (SIM) lock for a SIM or smart card associated with the phone. The SIM or smart card is often employed to enable the phone to access and utilize many of the phone features and includes identity information specific to the user. In practice, the network operator may institute a SIM lock in a number of ways. However, one common way to provide a SIM lock has been to use International Mobile Subscriber Identity (IMSI) locking. An IMSI is a unique number associated with a mobile subscription. The IMSI also conveys information about the identity of the network operator that provides the subscription. The IMSI is typically stored in the SIM, which may be a removable card, inside the phone and is sent by the phone to the network.

In theory, when the user initially powers up the mobile terminal in a network, the IMSI will be transmitted to identify the subscriber to the network operator. If a valid IMSI (e.g., an IMSI belonging to the network operator to which the mobile terminal is locked) is provided, the phone may get service from the network operator. However, if the IMSI provided does not belong to the network operator to which the phone is locked, then the phone cannot get network service.

A possible problem with the SIM lock mechanism described above has been that it may be relatively easy to insert a device between the SIM card and the mobile terminal device to alter communications therebetween. As such, for example, devices such as the X-SIM, UniversalSIM, Turbo-Sim, TornadoSim, Simable, NoKey and others have been developed. Devices like the X-SIM may make a phone or other mobile terminal useable with a network operator other than the one to which efforts have been made to lock the phone or mobile terminal. The X-SIM may do this by essentially enabling a bypass of the SIM lock by using a "man-in-the-middle" attack. In this regard, for example, the man-in-the-middle device may enable the phone to report an IMSI that satisfies the SIM lock conditions instead of reading it from the SIM card. If the device holds an IMSI value that fits the SIM lock conditions, SIM lock validation may be performed and the mobile terminal may be used on the network.

In this case, however, the IMSI obtained from the X-SIM cannot be used to connect to the network, since it represents a subscription belonging to the network operator that the mobile terminal is locked to, and does not reflect the subscription of the SIM card being used.

In order to reduce the likelihood that the user may be identified and/or tracked by a third party, some mobile terminals limit the number of times the IMSI is transmitted. Accordingly, a temporary mobile subscriber identity (TMSI), which is a temporary subscriber identifier associated with a particular location, is often communicated instead. The TMSI is a value that may be changed periodically and whenever the phone enters a different area. When a new TMSI is obtained from the network, it is stored on the SIM card, and subsequently used to identify the subscriber instead of the IMSI. If a TMSI used is rejected, then the IMSI may be sent to the network in order to permit network access via an IMSI attach procedure, which will cause the network to send a new, valid TMSI to the mobile terminal. In situations where an X-SIM is employed, for example, if the X-SIM is able to bypass the initial SIM lock by using a fake IMSI, the TMSI stored on the SIM card is typically used as subscriber identity instead of the IMSI. Thus, even if the IMSI provided to the mobile terminal by the X-SIM card does not match the subscription in the used SIM card, the TMSI can be used to successfully establish a connection to the network using the subscription of the SIM card. In this way, the mobile terminal can be used with a SIM card that would not normally pass the SIM lock, i.e. with a network operator other than the network operator to which the mobile terminal was locked.

Accordingly, it may be desirable to provide an improved mechanism for providing smart card security.

BRIEF SUMMARY

A method, apparatus and computer program product are therefore provided to enable providing improved smart card security. In this regard, for example, exemplary embodiments of the present invention may provide for a mechanism to make it more difficult for man-in-the-middle attacks to be accomplished. Accordingly, embodiments of the present invention may enable the detection and/or prevention of the use of a smart card from a network operator for which the mobile terminal is not authorized for use.

In an exemplary embodiment, a method of providing smart card security is provided. The method may include determining, for a mobile terminal locked to a network operator, whether a temporary subscriber identifier is being read from the smart card or whether the mobile terminal is receiving a new temporary subscriber identifier from a network in communication with the mobile terminal, comparing a network identifier associated with the temporary subscriber identifier to a network identifier included in a permanent subscriber identifier associated with the smart card in response to a determination that the temporary subscriber identifier is being read from the smart card, comparing a network identifier associated with the new temporary subscriber identifier to a network identifier associated with a previous temporary subscriber identifier in response to a determination that the new temporary subscriber identifier is received from the network, and determining whether to invalidate the temporary subscriber identifier or the new temporary subscriber identifier based on a result of a respective one of the comparing operations.

In another exemplary embodiment, a computer program product for providing smart card security is provided. The computer program product may include at least one computer-readable storage medium having computer-executable program code instructions stored therein. The computer-executable program code instructions may include first program code instructions, second program code instructions, third program code instructions and fourth program code instructions. The first program code instructions may be for determining, for a mobile terminal locked to a smart card, whether a temporary subscriber identifier is being read from the smart card or whether the mobile terminal is receiving a new temporary subscriber identifier from a network in communication with the mobile terminal. The second program code instructions may be for comparing a network identifier associated with the temporary subscriber identifier to a network identifier included in a permanent subscriber identifier associated with the smart card in response to a determination that the temporary subscriber identifier is being read from the smart card. The third program code instructions may be for comparing a network identifier associated with the new temporary subscriber identifier to a network identifier associated with a previous temporary subscriber identifier in response to a determination that the new temporary subscriber identifier is received from the network. The fourth program code instructions may be for determining whether to invalidate the temporary subscriber identifier or the new temporary subscriber identifier based on a result of a respective one of the comparing operations.

In another exemplary embodiment, an apparatus for providing smart card security is provided. The apparatus may include a processor. The processor may be configured to determine, for a mobile terminal locked to a smart card, whether a temporary subscriber identifier is being read from the smart card or whether the mobile terminal is receiving a new temporary subscriber identifier from a network in communication with the mobile terminal, compare a network identifier associated with the temporary subscriber identifier to a network identifier included in a permanent subscriber identifier associated with the smart card in response to a determination that the temporary subscriber identifier is being read from the smart card, compare a network identifier associated with the new temporary subscriber identifier to a network identifier associated with a previous temporary subscriber identifier in response to a determination that the new temporary subscriber identifier is received from the network, and determine whether to invalidate the temporary subscriber identifier or the new temporary subscriber identifier based on a result of a respective one of the comparing operations.

In yet another exemplary embodiment, an apparatus for providing smart card security is provided. The apparatus may include means for determining, for a mobile terminal locked to a smart card, whether a temporary subscriber identifier is being read from the smart card or whether the mobile terminal is receiving a new temporary subscriber identifier from a network in communication with the mobile terminal, means for comparing a network identifier associated with the temporary subscriber identifier to a network identifier included in a permanent subscriber identifier associated with the smart card in response to a determination that the temporary subscriber identifier is being read from the smart card, means for comparing a network identifier associated with the new temporary subscriber identifier to a network identifier associated with a previous temporary subscriber identifier in response to a determination that the new temporary subscriber identifier is received from the network, and means for determining whether to invalidate the temporary subscriber identifier or the new temporary subscriber identifier based on a result of a respective one of the comparing operations.

Embodiments of the invention may provide a method, apparatus and computer program product for employment, for example, in mobile environments. As a result, for example, network operators may enjoy improved capacity for maintaining control over devices that they have provided at low or no cost.

BRIEF DESCRIPTION OF THE DRAWING(S)

Having thus described embodiments of the invention in general terms, reference will now be made to the accompanying drawings, which are not necessarily drawn to scale, and wherein:

DETAILED DESCRIPTION

Embodiments of the present invention will now be described more fully hereinafter with reference to the accompanying drawings, in which some, but not all embodiments of the invention are shown. Indeed, embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information" and similar terms may be used interchangeably to refer to data capable of being transmitted, received and/or stored in accordance with embodiments of the present invention. Moreover, the term "exemplary", as used herein, is not provided to convey any qualitative assessment, but instead merely to convey an illustration of an example. Thus, use of any such terms should not be taken to limit the spirit and scope of embodiments of the present invention.

Embodiments of the present invention may be employed to, for example, provide improved security with respect to prevention of man-in-the-middle attacks on SIM or other smart cards. As will be described in greater detail below, embodiments of the present invention may provide a mechanism by which during power up or location updating, a network identifier validation may be performed. For example, when the TMSI is read (such as at power up of the mobile terminal), a network identifier included in the IMSI may be compared to a network identifier associated with the TMSI being read. Meanwhile, when a new TMSI is provided from the network, a network identifier associated with the new TMSI may be compared to a network identifier of the old TMSI. As a result of either of the network identifier validations described above, if the comparison does not result in a match, the TMSI (or new TMSI) may be treated as invalid and an attach procedure using the IMSI may be initiated. If the attach procedure using the IMSI is successfully accomplished, a new TMSI may be issued for use by the mobile terminal.

Figure 1:
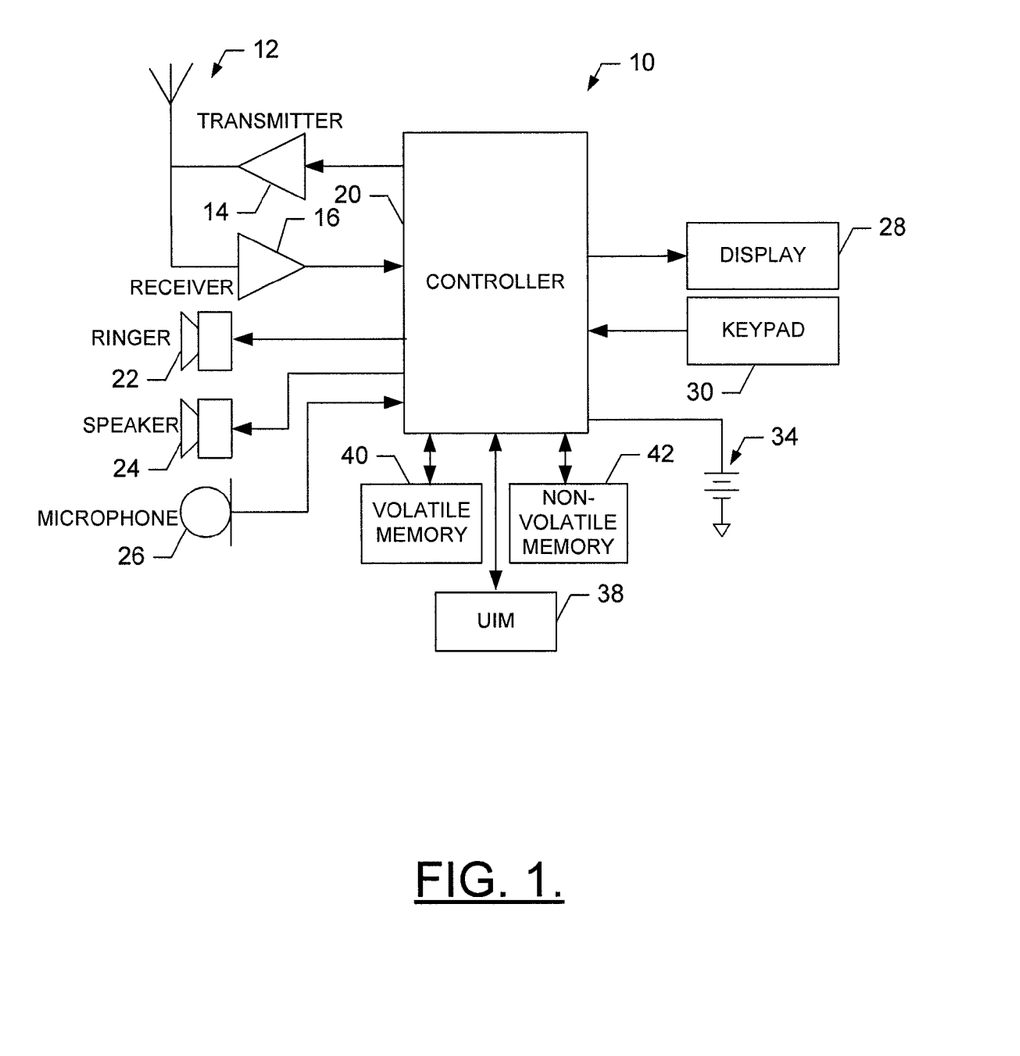
FIG. 1 is a schematic block diagram of a mobile terminal according to an exemplary embodiment of the present invention.

FIG. 1, one exemplary embodiment of the invention, illustrates a block diagram of a mobile terminal 10 that may benefit from embodiments of the present invention. It should be understood, however, that a mobile terminal as illustrated and hereinafter described is merely illustrative of one type of device that may benefit from embodiments of the present invention and, therefore, should not be taken to limit the scope of embodiments of the present invention. While several embodiments of the mobile terminal 10 may be illustrated and hereinafter described for purposes of example, other types of mobile terminals, such as portable digital assistants (PDAs), pagers, mobile televisions, gaming devices, all types of computers (e.g., laptops or mobile computers), cameras, audio/video players, radio, global positioning system (GPS) devices, or any combination of the aforementioned, and other types of communications systems, may readily employ embodiments of the present invention.

The mobile terminal 10 may include an antenna 12 (or multiple antennas) in operable communication with a transmitter 14 and a receiver 16. The mobile terminal 10 may further include an apparatus, such as a controller 20 or other processing element, that provides signals to and receives signals from the transmitter 14 and receiver 16, respectively. The signals may include signaling information in accordance with the air interface standard of the applicable cellular system, and/or may also include data corresponding to user speech, received data and/or user generated data. In this regard, the mobile terminal 10 may be capable of operating with one or more air interface standards, communication protocols, modulation types, and access types. By way of illustration, the mobile terminal 10 may be capable of operating in accordance with any of a number of first, second, third and/or fourth-generation communication protocols or the like. For example, the mobile terminal 10 may be capable of operating in accordance with second-generation (2G) wireless communication protocols IS-136 (time division multiple access (TDMA)), GSM (global system for mobile communication), and IS-95 (code division multiple access (CDMA)), or with third-generation (3G) wireless communication protocols, such as Universal Mobile Telecommunications System (UMTS), CDMA2000, wideband CDMA (WCDMA) and time division-synchronous CDMA (TD-SCDMA), with 3.9G wireless communication protocol such as E-UTRAN (evolved-universal terrestrial radio access network), with fourth-generation (4G) wireless communication protocols or the like. As an alternative (or additionally), the mobile terminal 10 may be capable of operating in accordance with non-cellular communication mechanisms. For example, the mobile terminal 10 may be capable of communication in a wireless local area network (WLAN) or other communication networks.

It is understood that the apparatus, such as the controller 20, may include circuitry implementing, among others, audio and logic functions of the mobile terminal 10. For example, the controller 20 may comprise a digital signal processor device, a microprocessor device, and various analog to digital converters, digital to analog converters, and/or other support circuits. Control and signal processing functions of the mobile terminal 10 are allocated between these devices according to their respective capabilities. The controller 20 thus may also include the functionality to convolutionally encode and interleave message and data prior to modulation and transmission. The controller 20 may additionally include an internal voice coder, and may include an internal data modem. Further, the controller 20 may include functionality to operate one or more software programs, which may be stored in memory. For example, the controller 20 may be capable of operating a connectivity program, such as a conventional Web browser. The connectivity program may then allow the mobile terminal 10 to transmit and receive Web content, such as location-based content and/or other web page content, according to a Wireless Application Protocol (WAP), Hypertext Transfer Protocol (HTTP) and/or the like, for example.

The mobile terminal 10 may also comprise a user interface including an output device such as an earphone or speaker 24, a ringer 22, a microphone 26, a display 28, and a user input interface, which may be coupled to the controller 20. The user input interface, which allows the mobile terminal 10 to receive data, may include any of a number of devices allowing the mobile terminal 10 to receive data, such as a keypad 30, a touch display (not shown) or other input device. In embodiments including the keypad 30, the keypad 30 may include numeric (0-9) and related keys (#, *), and other hard and soft keys used for operating the mobile terminal 10. Alternatively, the keypad 30 may include a conventional QWERTY keypad arrangement. The keypad 30 may also include various soft keys with associated functions. In addition, or alternatively, the mobile terminal 10 may include an interface device such as a joystick or other user input interface. The mobile terminal 10 further includes a battery 34, such as a vibrating battery pack, for powering various circuits that are used to operate the mobile terminal 10, as well as optionally providing mechanical vibration as a detectable output.

The mobile terminal 10 may further include a user identity module (UIM) 38, which may generically be referred to as a smart card. The UIM 38 is typically a memory device having a processor built in. The UIM 38 may include, for example, a subscriber identity module (SIM), a universal integrated circuit card (UICC), a universal subscriber identity module (USIM), a removable user identity module (R-UIM), or any other smart card. Thus, as used herein, the term "smart card" is meant to cover each of the specific examples of removable, subscriber specific memory devices listed above and other similar devices. The UIM 38, as one example of a smart card, typically stores information elements related to a mobile subscriber (e.g., the IMSI, TMSI and/or the like). In addition to the UIM 38, the mobile terminal 10 may be equipped with memory. For example, the mobile terminal 10 may include volatile memory 40, such as volatile Random Access Memory (RAM) including a cache area for the temporary storage of data. The mobile terminal 10 may also include other non-volatile memory 42, which may be embedded and/or may be removable. The non-volatile memory 42 may additionally or alternatively comprise an electrically erasable programmable read only memory (EEPROM), flash memory or the like. The memories may store any of a number of pieces of information, and data, used by the mobile terminal 10 to implement the functions of the mobile terminal 10. For example, the memories may include an identifier, such as an international mobile equipment identification (IMEI) code, capable of uniquely identifying the mobile terminal 10. Furthermore, the memories may store instructions for determining cell id information. Specifically, the memories may store an application program for execution by the controller 20, which determines an identity of the current cell, i.e., cell id identity or cell id information, with which the mobile terminal 10 is in communication.

An exemplary embodiment of the invention will now be described with reference to FIG. 2, in which certain elements of an apparatus for providing smart card security are displayed. The apparatus of FIG. 2 may be employed, for example, on the mobile terminal 10 of FIG. 1. However, it should be noted that the apparatus of FIG. 2, may also be employed on a variety of other devices, both mobile and fixed, and therefore, the present invention should not be limited to application on devices such as the mobile terminal 10 of FIG. 1. Alternatively, embodiments may be employed on a combination of devices including, for example, those listed above. Accordingly, embodiments of the present invention may be embodied wholly at a single device (e.g., the mobile terminal 10) or by devices in a client/server relationship. Furthermore, it should be noted that the devices or elements described below may not be mandatory and thus some may be omitted in certain embodiments.

Figure 2:
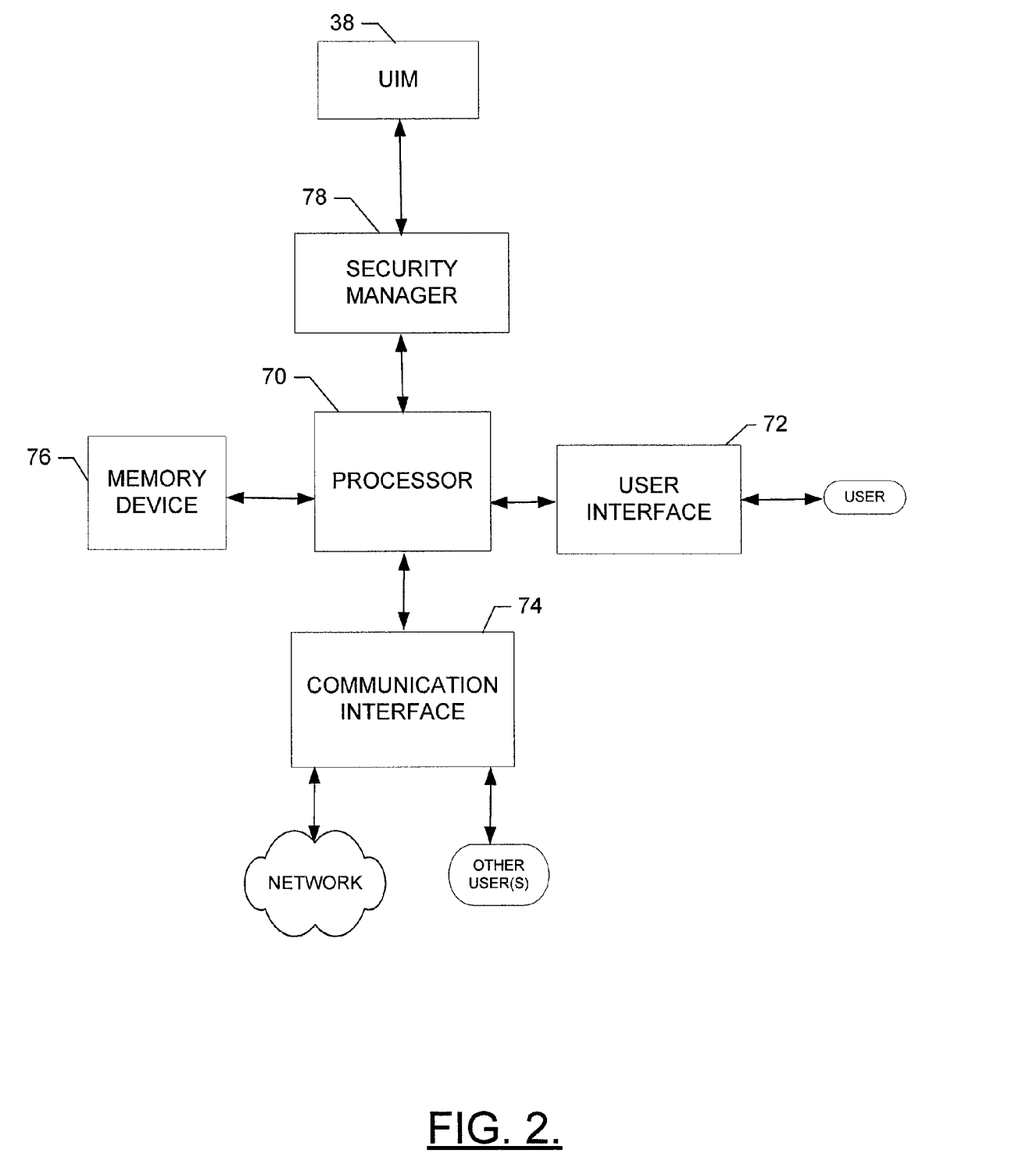
FIG. 2 is a schematic block diagram of an apparatus for providing smart card security according to an exemplary embodiment of the present invention.

Referring now to FIG. 2, an apparatus for providing trusted storage of temporary subscriber data is provided. The apparatus may include or otherwise be in communication with a processor 70, a user interface 72, a communication interface 74 and a memory device 76. The memory device 76 may include, for example, volatile and/or non-volatile memory (e.g., volatile memory 40 and/or non-volatile memory 42). The memory device 76 may be configured to store information, data, applications, instructions or the like for enabling the apparatus to carry out various functions in accordance with exemplary embodiments of the present invention. For example, the memory device 76 could be configured to buffer input data for processing by the processor 70. Additionally or alternatively, the memory device 76 could be configured to store instructions for execution by the processor 70. As yet another alternative, the memory device 76 may be one of a plurality of databases that store information and/or media content.

The processor 70 may be embodied in a number of different ways. For example, the processor 70 may be embodied as various processing means such as a processing element, a coprocessor, a controller or various other processing devices including integrated circuits such as, for example, an ASIC (application specific integrated circuit), a FPGA (field programmable gate array), a hardware accelerator, and/or the like. The processor 70 may be configured to execute instructions stored in the memory device 76 or otherwise accessible to the processor 70.

Meanwhile, the communication interface 74 may be embodied as any device or means embodied in either hardware, software, or a combination of hardware and software that is configured to receive and/or transmit data from/to a network and/or any other device or module in communication with the apparatus. In this regard, the communication interface 74 may include, for example, an antenna and supporting hardware and/or software for enabling communications with a wireless communication network. In fixed environments, the communication interface 74 may alternatively or also support wired communication. As such, the communication interface 74 may include a communication modem and/or other hardware/software for supporting communication via cable, digital subscriber line (DSL), universal serial bus (USB) or other mechanisms.

The user interface 72 may be in communication with the processor 70 to receive an indication of a user input at the user interface 72 and/or to provide an audible, visual, mechanical or other output to the user. As such, the user interface 72 may include, for example, a keyboard, a mouse, a joystick, a touch screen display, a conventional display, a microphone, a speaker, or other input/output mechanisms. In an exemplary embodiment in which the apparatus is embodied as a server or some other network devices, the user interface 72 may be limited, or eliminated. However, in an embodiment in which the apparatus is embodied as a mobile terminal (e.g., the mobile terminal 10), the user interface 72 may include, among other devices or elements, any or all of the speaker 24, the microphone 26, the display 28, and the keyboard 30.

In an exemplary embodiment, the processor 70 may be embodied as, include or otherwise control a security manager 78. The security manager 78 may be any means such as a device or circuitry embodied in hardware, software or a combination of hardware and software that is configured to perform the corresponding functions of the security manager 78 as described below. The security manager 78 may be configured to perform network identifier validations as described herein. In this regard, for example, the security manager 78 may be configured to perform comparisons between network identifiers associated with subscriber identifiers (e.g., permanent subscriber identifiers such as the IMSI) and/or temporary subscriber identifiers (e.g., TMSI), in which the comparisons may be used for purposes of determining whether the mobile terminal is being used with the smart card (e.g., UIM 38) to which the mobile terminal was locked initially. As such, for example, when a locking feature such as SIM lock is enabled, embodiments of the present invention may, via the security manager 78, provide security for subsidized handsets with respect to defending against man-in-the-middle attacks.

In an exemplary embodiment, the security manager 78 may be implemented at the mobile terminal 10 without necessarily requiring changes to current network operations or smart card operation. As such, the security manager 78 may be configured to perform network identifier validation in at least two particular instances. In this regard, for example, in situations where a temporary subscriber identifier (e.g., TMSI) is read from a smart card associated with the apparatus (e.g., read from the UIM 38 of the mobile terminal 10 on power up of the mobile terminal 10) the security manager 78 may compare network identifier information associated with the temporary subscriber identifier being read with network identifier information associated with a permanent subscriber identity (e.g., IMSI). Meanwhile, in situations where a new temporary subscriber identifier is received from the network (e.g., as a result of a location update), the network identifier associated with the new temporary subscriber identifier may be compared to the network identifier associated with the old temporary subscriber identifier. In either of the above cases, if the comparison of network identifiers does not result in a match, the temporary subscriber identifier may be considered invalid so that the mobile terminal 10 may utilize the permanent subscriber identifier (e.g., IMSI) for identification to the network.

In some embodiments, the network identifiers may include mobile country code (MCC) and mobile network code (MNC) values. Thus, for example, the network identifier information for a permanent subscriber identifier may be identified by the MCC and MNC that are part of the IMSI (e.g., each being a corresponding field within the IMSI), which may identify the home network of the user. The network identifier information for a temporary subscriber identifier may be identified by the MCC and MNC that are associated with the corresponding TMSI. As such, the MCC and MNC associated with any subscriber identifier (e.g., temporary or permanent) may serve to uniquely identify the corresponding network operator. Thus, in the context of preventing man-in-the-middle attacks, comparing the MCC and MNC as indicated by the corresponding values of the IMSI (which may identify the home network) or previous TMSI to the MCC and MNC of a current or new TMSI, when the mobile terminal 10 is roaming (e.g., being served by a network identified by a different MCC and MNC than that of the IMSI or that of the last used TMSI), may enable determinations as to whether a subsidized handset with SIM lock enabled is being inappropriately used. If it is determined, e.g., by the security manager 78, that the compared values do not match, the current or new TMSI may be considered invalid to that the IMSI may be used for identification toward the network. Using the IMSI for network identification (e.g., via IMSI attach) instead of the TMSI may present a situation for which a man-in-the-middle device, such as the X-SIM or others, may not be able to fake the IMSI attach procedure since, after IMSI attachment, the network will perform a secure authentication with the smart card that cannot be faked.

Accordingly, if the IMSI to which the mobile terminal 10 was originally locked is presented for identification to the network, a new TMSI may be provided and used by the mobile terminal 10 in the future. However, if the IMSI to which the mobile terminal 10 was originally locked is not presented for identification to the network, then the mobile terminal 10 may not be able to be used with a subscription other than the one to which the mobile terminal 10 was originally locked. In other words, if the IMSI attach procedure is not successful, the mobile terminal 10 may be rendered un-useable on the current network with the smart card that is currently active. As such, the security manager 78 may be configured to enable or disable user access to the network based on the results of the comparisons described above. In some cases, the security manager 78 may further effectively disable some or all access to features of the mobile terminal 10. However, in some embodiments, certain functionality, including an ability to make emergency calls may be preserved.

Notably, if a new TMSI is issued as a result of operation of the security manager 78 in the manner described above, the issuance of the new TMSI may not trigger a comparison of the new TMSI to any old TMSI. Instead, the operation of the security manager to verify network identifiers of a new or current TMSI against network identifiers of an old TMSI or the IMSI will result in the deletion of the old TMSI if the verification fails. Thus, there is technically no old TMSI to which a new TMSI may be compared in this instance.

In an exemplary embodiment, the security manager 78 may be configured to initially determine whether the conditions for applying the comparisons described above have been met. As such, for example, the security manager 78 may be configured to determine whether a temporary subscriber identifier is being read from the smart card (e.g., UIM 38) or whether the mobile terminal is receiving a new temporary subscriber identifier from the network. In response to a determination that the temporary subscriber identifier is being read from the smart card, the network identifier associated with the temporary subscriber identifier may be compared to the network identifier included in the permanent subscriber identifier of the smart card. If the network identifier associated with the temporary subscriber identifier fails to match the network identifier included in the permanent subscriber identifier of the smart card, the temporary subscriber identifier may be invalidated. In response to a determination that the new temporary subscriber identifier is received from the network, the network identifier of the new temporary subscriber identifier may be compared to the network identifier of the previous temporary subscriber identifier. If the network identifier of the new temporary subscriber identifier fails to match the network identifier of the previous temporary subscriber identifier, the new temporary subscriber identifier may be invalidated. In either case, if the temporary subscriber identifier is invalidated, the permanent subscriber identifier (e.g., IMSI) may be used for identification to the network.

Embodiments of the present invention may therefore improve security for mobile terminal handsets, at least with respect to making man-in-the-middle attacks more difficult. In this regard, for example, embodiments of the present invention may enable an enhancement to the effectiveness of SIM lock features by reducing the ease of use of X-SIM at unlocking mobile terminals for networks other than the network to which the mobile terminal is locked. Moreover, embodiments of the present invention may be utilized without any need for network or smart card changes.

Figure 3:
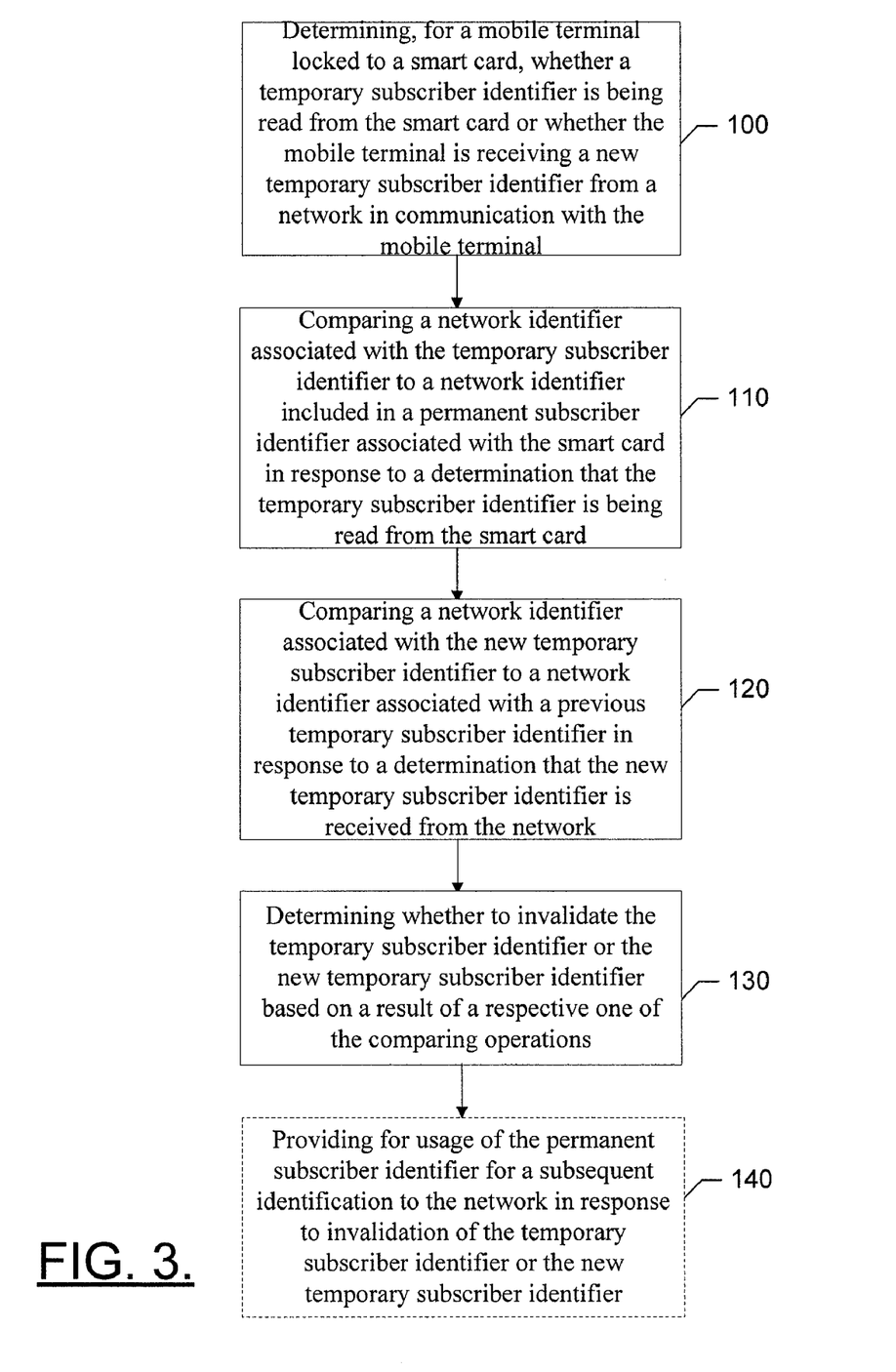
FIG. 3 is a flowchart according to an exemplary method for providing smart card security according to an exemplary embodiment of the present invention.

FIG. 3 is a flowchart of a system, method and program product according to exemplary embodiments of the invention. It will be understood that each block or step of the flowchart, and combinations of blocks in the flowchart, may be implemented by various means, such as hardware, firmware, and/or software including one or more computer program instructions. For example, one or more of the procedures described above may be embodied by computer program instructions. In this regard, the computer program instructions which embody the procedures described above may be stored by a memory device of a mobile terminal or other apparatus employing embodiments of the present invention and executed by a processor in the mobile terminal or other apparatus. As will be appreciated, any such computer program instructions may be loaded onto a computer or other programmable apparatus (i.e., hardware) to produce a machine, such that the instructions which execute on the computer (e.g., via a processor) or other programmable apparatus create means for implementing the functions specified in the flowchart block(s) or step(s). These computer program instructions may also be stored in a computer-readable memory that may direct a computer (e.g., the processor or another computing device) or other programmable apparatus to function in a particular manner, such that the instructions stored in the computer-readable memory produce an article of manufacture including instruction means which implement the function specified in the flowchart block(s) or step(s). The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the flowchart block(s) or step(s).

Accordingly, blocks or steps of the flowchart support combinations of means for performing the specified functions, combinations of steps for performing the specified functions and program instruction means for performing the specified functions. It will also be understood that one or more blocks or steps of the flowchart, and combinations of blocks or steps in the flowchart, may be implemented by special purpose hardware-based computer systems which perform the specified functions or steps, or combinations of special purpose hardware and computer instructions.

In this regard, one embodiment of a method for providing smart card security as illustrated, for example, in FIG. 3 may include determining, for a mobile terminal locked to a smart card, whether a temporary subscriber identifier is being read from the smart card or whether the mobile terminal is receiving a new temporary subscriber identifier from a network in communication with the mobile terminal at operation 100. At operation 110, a network identifier associated with the temporary subscriber identifier may be compared to a network identifier included in a permanent subscriber identifier associated with the smart card in response to a determination that the temporary subscriber identifier is being read from the smart card. A network identifier associated with the new temporary subscriber identifier may be compared to a network identifier associated with a previous temporary subscriber identifier in response to a determination that the new temporary subscriber identifier is received from the network at operation 120. The method may further include operation 130 of determining whether to invalidate the temporary subscriber identifier or the new temporary subscriber identifier based on a result of a respective one of the comparing operations 110 and 120.

Of note, as used in the context of the present invention, the term "new" is meant to convey the temporal concept of being most recently received or current. As such, the term new should not be construed to mean that the corresponding temporary subscriber identifier is original or has never been used before. Instead, the term new as it applies to a new temporary subscriber identifier conveys that the corresponding identifier is the currently received or most recently received identifier of its kind.

In an exemplary embodiment, the method may include further optional operations as well, an example of which is shown in FIG. 3 in dashed lines. In this regard, the method may further include providing for usage of the permanent subscriber identifier for a subsequent identification to the network in response to invalidation of the temporary subscriber identifier or the new temporary subscriber identifier at operation 140.

In some embodiments, certain ones of the operations above may be modified or further amplified as described below. It should be appreciated that each of the modifications or amplifications below may be included with the operations above either alone or in combination with any others among the features described herein. In this regard, for example, determining whether to invalidate the temporary subscriber identifier may include invalidating the temporary subscriber identifier in response to the network identifier associated with the temporary subscriber identifier failing to match the network identifier included in the permanent subscriber identifier. Meanwhile, determining whether to invalidate the new temporary subscriber identifier may include invalidating the new temporary subscriber identifier in response the network identifier associated with the new temporary subscriber identifier failing to match the network identifier associated with the previous temporary subscriber identifier. In an exemplary embodiment, comparing the network identifier associated with the temporary subscriber identifier to the network identifier included in the permanent subscriber identifier may include comparing a mobile country code and mobile network code associated with the temporary subscriber identifier to a mobile country code and mobile network code included in the permanent subscriber identifier. Moreover, in some embodiments, comparing the network identifier of the new temporary subscriber identifier to the network identifier of a previous temporary subscriber identifier may include comparing a mobile country code and mobile network code associated with the new temporary subscriber identifier to a mobile country code and mobile network code associated with a previous temporary subscriber identifier.

In an exemplary embodiment, an apparatus for performing the method of FIG. 3 above may comprise a processor (e.g., the processor 70) configured to perform each of the operations (100-140) described above. The processor may, for example, be configured to perform the operations (100-140) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 100 to 140 may comprise, for example, the processor 70 and/or the security manager 78, or an algorithm executed by the processor for controlling the application of comparators to the values described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:
   determining, for a mobile terminal locked to a smart card, whether a temporary subscriber identifier is being read from the smart card or whether the mobile terminal is receiving a new temporary subscriber identifier from a network in communication with the mobile terminal;
   comparing a network identifier associated with the temporary subscriber identifier to a network identifier included in a permanent subscriber identifier associated with the smart card in response to a determination that the temporary subscriber identifier is being read from the smart card;
   comparing a network identifier associated with the new temporary subscriber identifier to a network identifier associated with a previous temporary subscriber identifier in response to a determination that the new temporary subscriber identifier is received from the network; and
   determining whether to invalidate the temporary subscriber identifier or the new temporary subscriber identifier based on a result of a respective one of the comparing operations.

2. The method of claim 1, wherein determining whether to invalidate the temporary subscriber identifier comprises invalidating the temporary subscriber identifier in response to the network identifier associated with the temporary subscriber identifier failing to match the network identifier included in the permanent subscriber identifier.

3. The method of claim 1, wherein determining whether to invalidate the new temporary subscriber identifier comprises invalidating the new temporary subscriber identifier in response the network identifier associated with the new temporary subscriber identifier failing to match the network identifier associated with the previous temporary subscriber identifier.

4. The method of claim 1, further comprising providing for usage of the permanent subscriber identifier for a subsequent identification to the network in response to invalidation of the temporary subscriber identifier or the new temporary subscriber identifier.

5. The method of claim 1, wherein comparing the network identifier associated with the temporary subscriber identifier to the network identifier included in the permanent subscriber identifier comprises comparing a mobile country code and mobile network code associated with the temporary subscriber identifier to a mobile country code and mobile network code included in the permanent subscriber identifier.

6. The method of claim 1, wherein comparing the network identifier of the new temporary subscriber identifier to the network identifier of a previous temporary subscriber identifier comprises comparing a mobile country code and mobile network code associated with the new temporary subscriber identifier to a mobile country code and mobile network code associated with a previous temporary subscriber identifier.

7. An apparatus comprising:
a processor; and
a memory including computer program code, the memory and the computer program code configured to, with the processor, cause the apparatus to at least:
determine, for a mobile terminal locked to a smart card, whether a temporary subscriber identifier is being read from the smart card or whether the mobile terminal is receiving a new temporary subscriber identifier from a network in communication with the mobile terminal;
compare a network identifier associated with the temporary subscriber identifier to a network identifier included in a permanent subscriber identifier associated with the smart card in response to a determination that the temporary subscriber identifier is being read from the smart card;
compare a network identifier associated with the new temporary subscriber identifier to a network identifier associated with a previous temporary subscriber identifier in response to a determination that the new temporary subscriber identifier is received from the network; and
determine whether to invalidate the temporary subscriber identifier or the new temporary subscriber identifier based on a result of a respective one of the comparing operations.

8. The apparatus of claim 7, wherein the memory including the computer program code is further configured to, with the processor, cause the apparatus to determine whether to invalidate the temporary subscriber identifier by invalidating the temporary subscriber identifier in response to the network identifier associated with the temporary subscriber identifier failing to match the network identifier included in the permanent subscriber identifier.

9. The apparatus of claim 7, wherein the memory including the computer program code is further configured to, with the processor, cause the apparatus to determine whether to invalidate the new temporary subscriber identifier by invalidating the new temporary subscriber identifier in response the network identifier associated with the new temporary subscriber identifier failing to match the network identifier associated with the previous temporary subscriber identifier.

10. The apparatus of claim 7, wherein the memory including the computer program code is further configured to, with the processor, cause the apparatus to provide for usage of the permanent subscriber identifier for a subsequent identification to the network in response to invalidation of the temporary subscriber identifier or the new temporary subscriber identifier.

11. The apparatus of claim 7, wherein the memory including the computer program code is further configured to, with the processor, cause the apparatus to compare the network identifier associated with the temporary subscriber identifier to the network identifier included in the permanent subscriber identifier by comparing a mobile country code and mobile network code associated with the temporary subscriber identifier to a mobile country code and mobile network code included in the permanent subscriber identifier.

12. The apparatus of claim 7, wherein the memory including the computer program code is further configured to, with the processor, cause the apparatus to compare the network identifier of the new temporary subscriber identifier to the network identifier of the previous temporary subscriber identifier by comparing a mobile country code and mobile network code associated with the new temporary subscriber identifier to a mobile country code and mobile network code associated with a previous temporary subscriber identifier.

13. A computer program product comprising at least one computer-readable non-transitory storage medium having computer-executable program instruction stored therein, the computer-executable program instructions comprising:
first program code instructions for determining, for a mobile terminal locked to a smart card, whether a temporary subscriber identifier is being read from the smart card or whether the mobile terminal is receiving a new temporary subscriber identifier from a network in communication with the mobile terminal;
second program code instructions for comparing a network identifier associated with the temporary subscriber identifier to a network identifier included in a permanent subscriber identifier associated with the smart card in response to a determination that the temporary subscriber identifier is being read from the smart card;
third program code instructions for comparing a network identifier associated with the new temporary subscriber identifier to a network identifier associated with a previous temporary subscriber identifier in response to a determination that the new temporary subscriber identifier is received from the network; and
fourth program code instructions for determining whether to invalidate the temporary subscriber identifier or the new temporary subscriber identifier based on a result of a respective one of the comparing operations.

14. The computer program product of claim 13, wherein the fourth program code instructions include instructions for invalidating the temporary subscriber identifier in response to the network identifier associated with the temporary subscriber identifier failing to match the network identifier included in the permanent subscriber identifier.

15. The computer program product of claim 13, wherein the fourth program code instructions include instructions for invalidating the new temporary subscriber identifier in response the network identifier associated with the new temporary subscriber identifier failing to match the network identifier associated with the previous temporary subscriber identifier.

16. The computer program product of claim 13, further comprising fifth program code instructions for providing for usage of the permanent subscriber identifier for a subsequent identification to the network in response to invalidation of the temporary subscriber identifier or the new temporary subscriber identifier.

17. The computer program product of claim 13, wherein the second program code instructions include instructions for comparing a mobile country code and mobile network code associated with the temporary subscriber identifier to a mobile country code and mobile network code included in the permanent subscriber identifier.

18. The computer program product of claim 13, wherein the third program code instructions include instructions for comparing a mobile country code and mobile network code associated with the new temporary subscriber identifier to a mobile country code and mobile network code associated with a previous temporary subscriber identifier.

19. An apparatus comprising:
means for determining, for a mobile terminal locked to a smart card, whether a temporary subscriber identifier is being read from the smart card or whether the mobile terminal is receiving a new temporary subscriber identifier from a network in communication with the mobile terminal;
means for comparing a network identifier associated with the temporary subscriber identifier to a network identifier included in a permanent subscriber identifier associated with the smart card in response to a determination that the temporary subscriber identifier is being read from the smart card;
means for comparing a network identifier associated with the new temporary subscriber identifier to a network identifier associated with a previous temporary subscriber identifier in response to a determination that the new temporary subscriber identifier is received from the network; and
means for determining whether to invalidate the temporary subscriber identifier or the new temporary subscriber identifier based on a result of a respective one of the comparing operations.

20. The apparatus of claim 19, further comprising means for providing for usage of the permanent subscriber identifier for a subsequent identification to the network in response to invalidation of the temporary subscriber identifier or the new temporary subscriber identifier.

* * * * *